Figure 1:
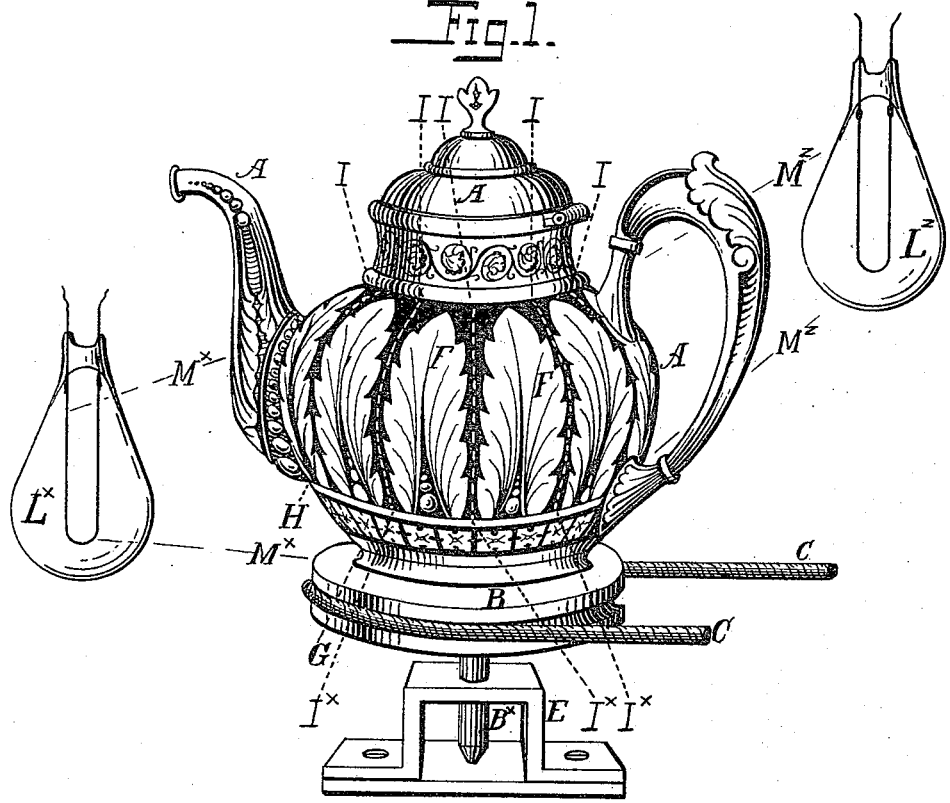

(No Model.)

W. J. DOBINSON.
METHOD OF DECORATING SPHERICAL AND UNEVEN SURFACES OF GLASS, EARTHENWARE, &c.

No. 441,086. Patented Nov. 18, 1890.

Witnesses.
Henry W. Austin
H. Dunlass

Inventor.
Wm. J. Dobinson

UNITED STATES PATENT OFFICE.

WILLIAM J. DOBINSON, OF SOMERVILLE, MASSACHUSETTS.

METHOD OF DECORATING SPHERICAL AND UNEVEN SURFACES OF GLASS, EARTHENWARE, &c.

SPECIFICATION forming part of Letters Patent No. 441,086, dated November 18, 1890.

Application filed February 9, 1889. Renewed October 1, 1890. Serial No. 366,789. (No model.)

*To all whom it may concern:*

Be it known that I, WILLIAM J. DOBINSON, of Somerville, in the county of Middlesex and State of Massachusetts, have invented a new and useful Improvement in Decorating Spherical and Uneven Surfaces of Glass, Earthenware, Porcelain, and Metals, of which the following, taken in connection with the accompanying drawings, is a specification; and I do hereby declare that the following is a full, clear, and exact description of the invention, which will enable others skilled in the art to which it appertains to make and use the same.
The object of my invention is to produce any desired ornamentation on spherical and uneven surfaces of articles such as named by producing a film negative of the design on collodion, celluloid, or zylonite, and causing absolute contact of said negative pattern with a sensitive film on the surface, and then by the action of light printing the design from the film negative so placed on the surface of the article.
To carry my invention into effect, I draw the design on bristol-board in india-ink, and by means of a camera take a negative, and then from this produce a photo-diapositive by any well-known process of photography. The diapositive or "negative," as it may be termed, is then flowed over with a thick coating of collodion made tough and flexible by the addition of a small quantity of castor-oil or of a resin. When dry, the coating of collodion forms a film with the photographic image of the design upon it, which said film is then stripped from its glass support in an acid bath in the ordinary manner. A plain transparent or translucent film may be made first of collodion, celluloid, or zylonite and the design printed on it by photography or printing-press in any ordinary manner. I now take the article to be decorated and oil its surface with olive-oil or an oleaginous mixture and place the film with the photographic side down in its proper position on the surface; but as the thick film will not conform to the spherical or uneven surface it is dampened with alcohol, which I have found by experiment softens the film of collodion, celluloid, or zylonite without dissolving said film and renders it supple and plastic, so that the film may be stretched to a much larger size or contracted to a smaller size, and thus brings said film into conformity with the spherical or uneven surface without wrinkling or visibly distorting the design. If the curve or irregularity of the surface is so great as to cause visible distortion, when molding the flat film to fit the curve I lay out the design on a curved base-line in like manner, hereinafter stated, as to design shown in Fig. 2, sometimes leaving gaps or spaces between parts of the design, which vary according to the character of the design, so that when the film is molded to the shape the parts of the design will meet and form a complete design without distortion, as hereinafter shown in Figure 1. When the alcohol has evaporated, the film hardens and keeps its shape; but it is not affected by moisture, as in the case of gelatinous films. A small quantity of castor-oil may be added to the alcohol to replace any which may dialyze out of the film. When dry, the film is stripped off and will be found to retain the required shape.

The article to be decorated is thoroughly cleansed from grease and taken to the darkroom—*i. e.*, a room lighted with yellow light— and a sensitive film is made on its surface by pouring over it a suitable sensitive solution, which may be composed as follows: white of one egg; water, seven ounces; saturated solution of bichromate of potash, one ounce. The article is now drained and placed in a drying-oven, which should be kept at a moderate temperature. When dry, it is removed, and while warm the article and film negative hereinbefore designated are lightly rubbed over with olive-oil or oleaginous mixture. The film negative is then adjusted to its proper position and gently rubbed down with a soft cloth, when the photo-film will be found to adhere to the article in close contact, and yet at any time be removable without damage. A gelatine film I have found by experiment may be kept in close contact by the same means. Sometimes, and especially if gelatine be used, it is best to add more or less printers' varnish or wax to the olive-oil. The article is now ready for exposure, and if direct light is used I place it on a revolving wheel or lathe to equalize the illumination, which may come from the sun or electric lights. Around this wheel and equidistant from its center may be placed two or more incandescent lights, some of which are below the center of the article and others above. After exposure the article is taken to the dark-room, where the film negative is removed by lifting one corner and gently peeling it off. The film negative may thereafter be used for any number of successive decorations of same design on other articles of same shape, and as it is strong and tough with ordinary care it will last for a long time. The oil is now removed by means of a cloth wet with benzol. The sensitive film on the article is now inked up—i. e., coated with a thin film of printers' ink by dipping in a bath of varnish made by dissolution of printers' ink in benzole, to which may be added a little resin or wax.

The article after draining and drying for a few minutes is placed in a bath of cold water, when it is gently rubbed over with a tuft of cotton, and the ink and albumen on the back not exposed will wash off, leaving the background of the ornament in black. It is then taken into the light, and when dry is dusted over with a resinous powder, which adheres to the ink, all excess being taken off by a brush. The resin is now melted in an oven heated to between 160° and 190° Fahrenheit. After cooling the articles may be painted over with asphaltum varnish all around the ornament and wherever the acid is not intended to etch, and after drying it is placed in a suitable mordant and bitten to the desired depth. After rinsing in cold water the asphaltum and albumen are cleaned off, and the article is decorated with the required design.

For the purpose of illustration I have shown in the accompanying drawings, forming part of this specification, the adaptation of my process to a metallic tea-pot, and the application of foliated and similar designs for use in said process.

Figure 2:
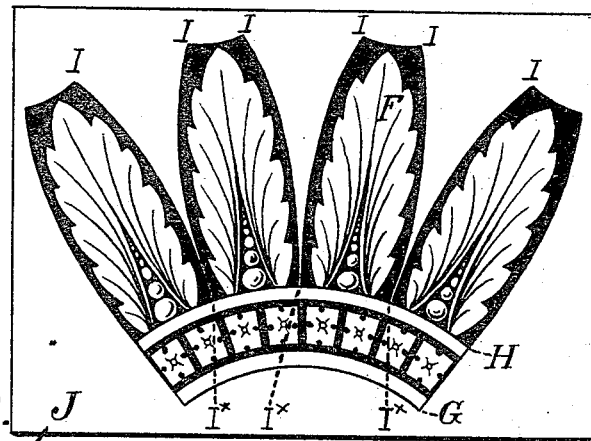

In the drawings, Fig. 1 is an elevation in perspective of the tea-pot resting on the revolving lathe and exposed to two incandescent lights. Fig. 2 is a plan of the negative for one-third of the circumference of the tea-pot.

A is a tea-pot of metal.

B is a revolving table. $B^x$ is a spindle of said wheel B; E, the bearing on which the spindle $B^x$ revolves.

C is the driving-band, which rests in the groove of the circumference of the wheel B and is connected with clock-work or other suitable motor to revolve the wheel B.

F is the negative.

G is the edge of the negative and guide-line to place it on correctly.

H is the line showing the beginning or apex of the gaps between the foliations.

$I^x$ is an apex of the gap.

J may represent the glass supporting the negative F.

$L^x$ is the incandescent light on the left, and $L^z$ the light on the right.

$M^x$ represents the rays from the light $L^x$; $M^z$, the rays from the light $L^z$.

The design, which is apparent from Fig. 2, is drawn in india-ink on bristol-board, leaving the gaps between the foliations, so that when the film is placed on the tea-pot the edges of the gap may meet and cover the surface without distortion, as is obvious from Fig. 1, where the dotted lines show the edges of the gap. From the drawings, by the means hereinbefore stated, a film of collodion with the photographic image of the design thereupon is obtained. A guide-line is placed on the tea-pot A corresponding to the line E on the negative to assist in the adjustment of the film.

The surface of the tea-pot A is rubbed with olive-oil and the collodion film, with the photographic side down, placed upon the surface thus oiled, and then dampened with alcohol. The edges of the gap and the lines I I are brought together, as previously stated, and sometimes may be cemented by applying fresh collodion with the brush. When dry, the collodion film is removed. The tea-pot A, cleansed from grease, is taken into the dark-room and the sensitive film above described made on its surface. After being properly drained and dried, and while the tea-pot A is warm, as above described, the surface of the tea-pot and the collodion-film negative are lightly rubbed over with olive-oil, and the film negative is then adjusted in position on tea-pot A and gently rubbed down with a soft cloth, when the said film negative adheres in close contact to the sensitive film on the surface of the tea-pot, and yet may be removed without damage. The tea-pot A is then placed on the slowly-revolving wheel B. Around this wheel B and equidistant from its center are two or more incandescent lights, some of which, as $L^x$, are below the center of the tea-pot, and others, as $L^z$, above, to equalize the illumination, as shown by the rays of light $M^x$ and $M^z$. After exposure the tea-pot is taken into the dark-room, where the film negative is removed and the oil wiped off by a cloth dipped in benzole. The tea-pot A is then dipped in a bath of varnish, hereinbefore described, which should not be thick enough to cause the metallic surface to look black, but should leave it of a dry gray color. After draining and drying two minutes, the tea-pot is placed in a bath of cold water, and by a tuft of cotton the ink and albumen on the parts not exposed washed off, when the leaves and squares of the design will appear black, while the fibers, lines, and background will be bare metal. The tea-pot is now taken into the light, dried, and dusted over with a resinous powder, and the resin melted, all as above described. After cooling and being painted around the design with asphaltum varnish, the tea-pot is placed in a suitable mordant and bitten to the desired depth, afterward rinsed and cleansed, as above stated. If desired, it may now be electroplated with silver, then oxidized, and finally buffed on the surface, taking care not to rub the oxide out of the lines, which now appear sunken and of a blue-black color, while the leaves and general surface are raised and of polished silver. In some cases, after biting in the lines, copper or other metal may be deposited therein, so as to be level with the surface, when the effect of inlaid work is produced, or the deposited metal may project above the surface, when it has the appearance of incrustation; also, after biting in the design certain parts may be stopped out, and others have a metal deposited in them, by which means varied and elegant results are produced. The direct rays of the sun may be used instead of incandescent light. The finest lines of the design are obtained or etched on the article by my process.

I am aware that metallic surfaces have been decorated by a process in which a gelatine-film negative has been used; but owing to the difficulty of producing absolute contact between the negative and curved surface on the article such a process has only been applicable to plane surfaces or articles of slight curvature of surface, in which a ring or band could be used to hold the film on the surface, whereas in my process no band is required, and absolute contact is obtained between the photo-film and surface of the article, and all spherical or uneven surfaces are readily decorated.

Very fine work may be done by my process, and if direct rays of sunlight at noon in summer be had thirty to fifty seconds are required for work very finely lined.

Having described my process, I claim as my invention—

1. In decorating spherical and uneven surfaces, the process of adapting a film of collodion, celluloid, or zylonite to the contour of such surfaces, which consists in softening said film by alcohol and drying on the said surface, as described.

2. In decorating spherical and uneven surfaces, the process of making close contact between a film of collodion or other substance and a sensitive film on the surface of the article, which consists in rubbing over the films with olive-oil or oleaginous substance, as described.

3. In decorating spherical or uneven surfaces, the process of equalizing the illumination to which the articles with the films thereon are exposed, which consists in revolving said article during exposure.

4. In decorating spherical and uneven surfaces, the process of inking the surface of the sensitive film after exposure, which consists in coating the film with a varnish of printers' ink dissolved in benzole or suitable solvent not affecting said film, all substantially as described.

5. In decorating spherical or uneven surfaces, the process of depositing metal in the lines of the design etched on the surface of the article of uneven or spherical contour by means of a photographic film and suitable mordants, as described.

6. The process of decorating articles with spherical or uneven surfaces, which consists in making a collodion, celluloid, or zylonite film with the image of the design thereon, softening the same by alcohol and shaping it to the article, bringing the same in close contact with the sensitive film, as described, by means of olive-oil or equivalent substance, and then biting the lines of the design on the article by means of suitable mordants, as described.

7. In decorating spherical and uneven surfaces, the process of preventing distortion of design by laying out said design on a curved base-line, as described.

8. In decorating spherical or uneven surfaces, the process of adapting the design to the contour of the surface by leaving gaps or spaces between parts of the design on the flat film negative, all as described.

In testimony whereof I have signed my name to this specification, in the presence of two subscribing witnesses, on this 21st day of January, A. D. 1889.

WM. J. DOBINSON.

Witnesses:
   HENRY W. AUSTIN,
   H. DUNHAM.